Oct. 28, 1930.  A. E. SHORT ET AL  1,779,754
AMPHIBIAN AIRCRAFT
Filed Nov. 14, 1929   3 Sheets-Sheet 2

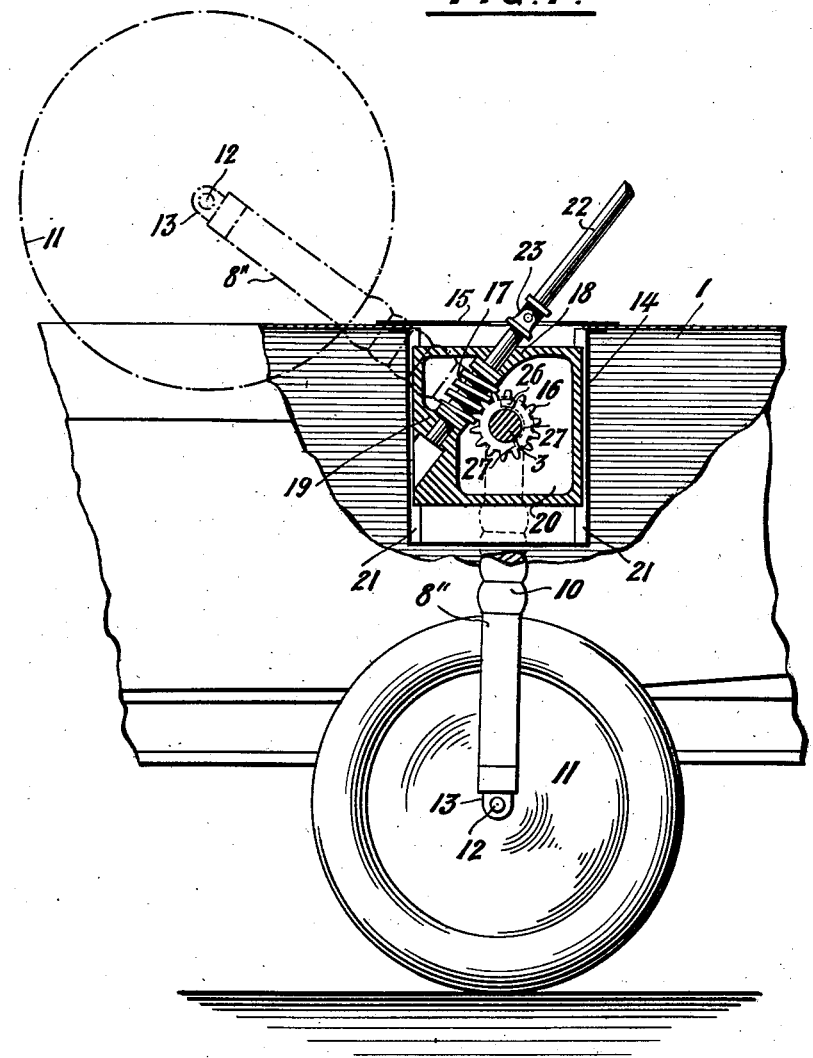

Patented Oct. 28, 1930

1,779,754

UNITED STATES PATENT OFFICE

ALBERT EUSTACE SHORT AND HUGH OSWALD SHORT, OF ROCHESTER, ENGLAND

AMPHIBIAN AIRCRAFT

Application filed November 14, 1929, Serial No. 407,200, and in Great Britain June 5, 1929.

This invention relates to amphibian aircraft of the type in which a buoyant body, such as a float or boat, is employed located below the central portion or body of the aircraft, and refers more particularly to landing gear to enable such aircraft to descend on land. Such aircraft has been proposed in which landing wheels are adapted to be moved into two positions, in one of which they project below the buoyant body for descending on land, and in the other of which they are raised for a descent on water.

The object of the present invention is to provide improved landing gear of simple and robust construction which can be readily applied to such aircraft, and which can be easily operated from the cockpit of the aeroplane without adding to the controls in front of the pilot.

Landing gear according to this invention comprises an axle mounted so as to be angularly adjustable, forks carried on the ends of the axle, wheels mounted on said forks, and hand-operated gearing for turning said axle so as to raise and lower the wheels as required.

Other features of this invention will be apparent from the following description, and will be set out in the appended claims.

In the drawing:—

Fig. 4 is an elevation of the landing gear and a fragment of the float drawn to an enlarged scale and having part of the float broken away to show the gearing, the landing wheels being shown in full lines in their lower position and in dotted lines in their raised position.

Figure 1:
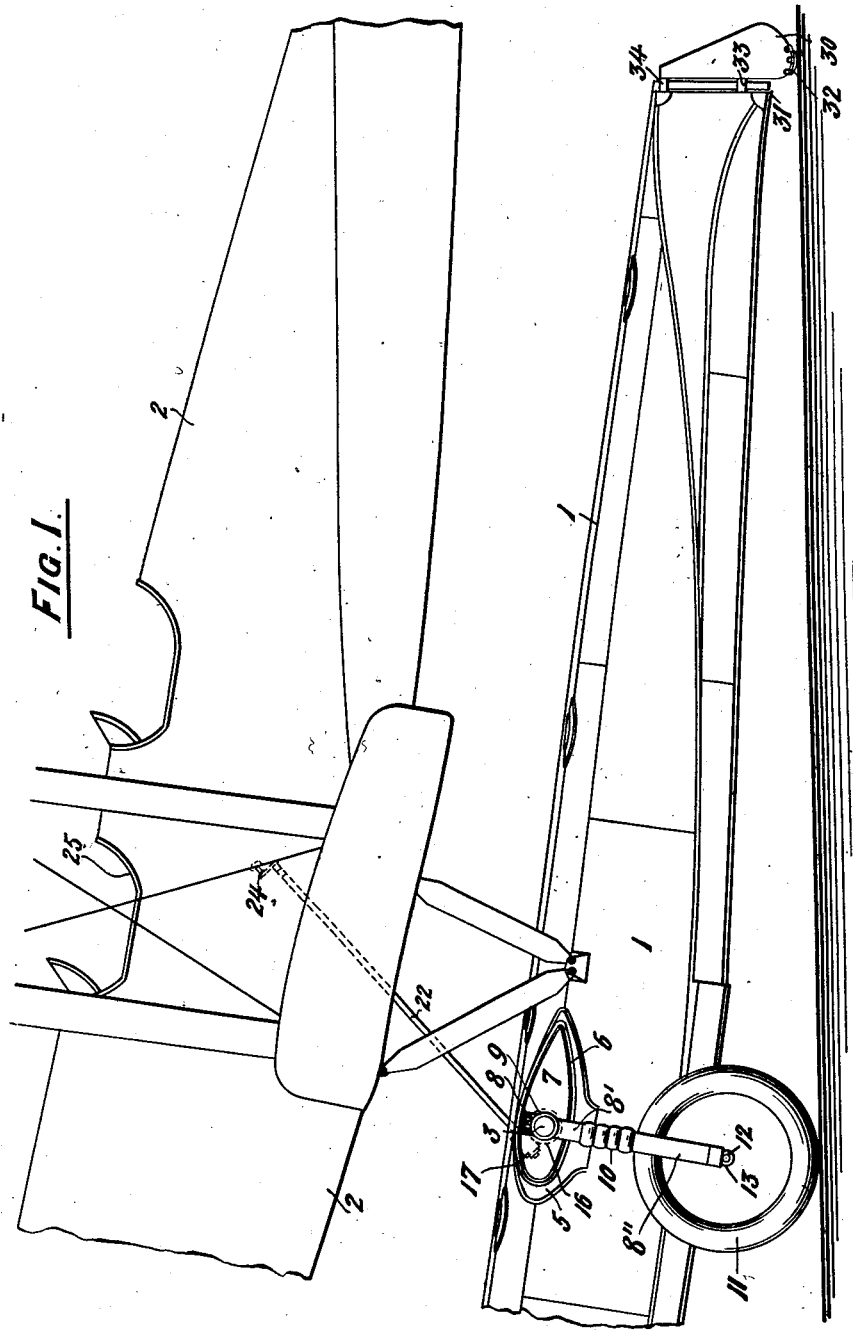
Fig. 1 is a fragmentary side elevation showing the landing gear according to this invention as applied to a seaplane type of amphibian aircraft, with the seaplane resting on the landing gear upon the ground.

The seaplane shown in the drawing comprises a buoyant body in the form of a single central float 1 located centrally beneath the fuselage 2 and provided towards its forward end with an axle 3 the centre part of which extends through the float adjacent the top thereof and the ends of which will project laterally from the sides of the float. This axle is supported by a pair of intermediate bearings 4 fixed to the float, one on each side thereof. This axle 3, where it extends from the sides of the float, is provided with streamline bodies by which the axle is faired, two of these bodies being located at each side of the float. The streamline body marked 5 is fixed to the float and extends outwardly for a short distance therefrom so as to cover the bearings 4, while the other streamline body marked 6 is secured at its one end to the outer end of the streamline body 5 and extends outwardly therefrom. This streamline body 6 is provided at its outer end with a vertical slot 8 to permit of a small veritcal movement of the axle 3.

The axle 3 projects beyond the end 7 of the streamline body 6 and has fixed on each end thereof fork members 8' which are carried by sleeves 9 fixed on the end of the axle. These fork members are of telescopic form with the lower part 8'' fitting telescopically in the upper part 8', and are provided with elastic cushioning devices 10 located between the two telescopic parts of each fork so as to absorb shock.

Figure 2:
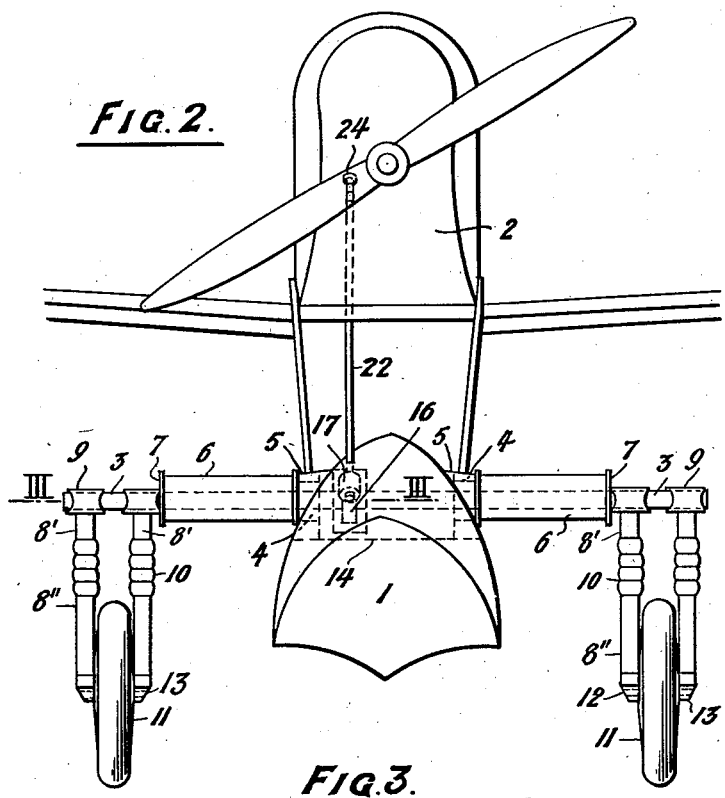
Fig. 2 is a fragmentary front elevation of the seaplane.
Figure 3:
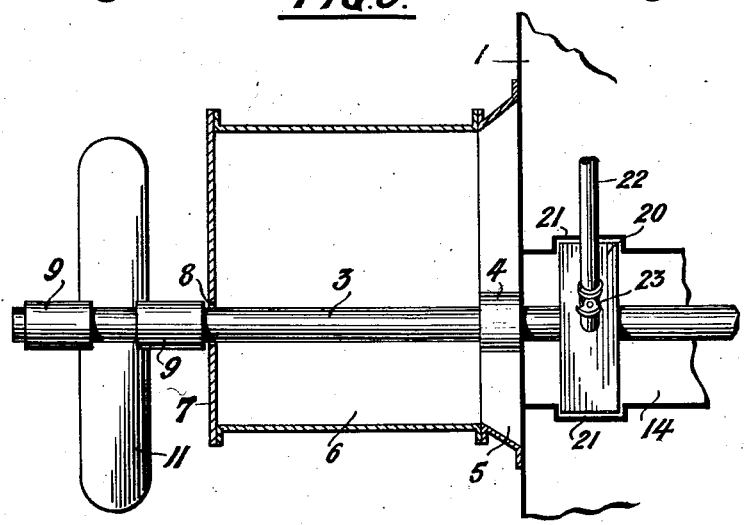
Fig. 3 is a fragmentary sectional plan view on the line III—III in Fig. 2, drawn to an enlarged scale.

At the lower end of the forks pneumatic tired wheels 11 are located, these wheels being mounted upon trunnions 12 fitting in bearings 13 on the ends of the forks. Thus the wheels are carried by the forks which are mounted on both ends of the axle and which project radially from said axle. The axle is angularly adjustable about its own axis in the bearings 4 fixed within and at the opposite ends of a transverse trough 14 extending across the float to which it is fixed so that the forks can be turned from a downwardly depending position, shown in Figs. 1 and 2 and in full lines in Fig. 4, to an upwardly projecting position, shown in dotted lines in Fig. 4. In the downwardly depending position the forks project the wheels beyond the bottom of the float so that the wheels are in a position for landing on ground. In their upwardly projecting position the wheels extend above the float so as to be clear of the water when the aircraft is to descend thereon, and moreover, in this upwardly projecting position the wheels offer very little head resistance. The trough 14 is normally covered by a cover plate 15 located over its central portion while its ends are covered by the inner fixed streamline casing 5. If desired the trough 14 and the fairings 5 may be prolonged beyond the sides of the float so as to enable the bearings to be located further apart and thus reduce the length of the unsupported outer ends of the axle.

In order to impart the necessary angular adjustment of the shaft for the purpose of moving the wheels into and holding them in the desired position, low ratio gearing is provided consisting of a worm wheel 16 fixed on the axle 3, located within the float 1, and meshing with a worm 17. The worm 17 and worm wheel 16 are mounted in bearings 18 and 19 in a bearing box 20 made of light cast metal, which box is free to slide vertically in a pair of grooves 21 formed in the transverse trough 14. The worm is hand-operated through the medium of an operating shaft 22 which is connected to the worm through a universal joint 23 and extends across the space between the float 1 and the fuselage 2 and projects at its upper end into the fuselage where it is provided with a crank handle 24 located in the cockpit 25 at a point close to the side of the pilot so that he can rotate the crank handle 24 and thereby angularly adjust the axle without having any lever or operable part added to the control levers in front of him.

This low ratio gearing prevents the axle turning except when operated by the hand-operating device, and a stop 26 is fixed on the worm wheel 16 and engages in a quadrantal slot 27 in the bearing box 20 which limits the movement of the worm wheel and thus prevents overwinding in either direction.

With the arrangement described, the shaft 3 is mounted in the intermediate bearings 4 at the sides of the float 1 and the operating gear for imparting the necessary angular movement to the shaft is located between the bearings. The central portion of the shaft is thus free to bend elastically downwards as the outer ends of the shaft bend elastically upwards, and vice versa, under stress of landing. The sliding of the bearing box containing the low ratio gearing makes this free to follow the movement of the central part of the axle.

The rudder 30 on the float is constructed to act as a skid in addition to serving the normal purpose of steering the aircraft in water, the lower portion extending below the stern 31 of the float and being provided with a shoe 32 adapted to contact with the ground. The rudder is mounted on the stern of the float by the brackets 33 and 34. This rudder forms the subject matter of a separate application filed concurrently herewith.

What we claim as our invention and desire to secure by Letters Patent is:—

1. Landing gear for amphibian aircraft comprising an axle, forks carried on the ends of the axle, wheels mounted on said forks, two intermediate bearings supporting said axle and allowing it to be angularly adjusted, hand-operated gearing for turning said axle so as to raise and lower the wheels as required, said gearing being located between the bearings so as to permit the axle to bend elastically, and means for mounting said gearing so that it is free to follow the bending of the axle.

2. Landing gear for amphibian aircraft comprising an axle, forks carried on the ends of the axle, wheels mounted on said forks, two intermediate bearings supporting said axle and allowing it to be angularly adjusted, low ratio hand-operated gearing for turning said axle so as to raise and lower the wheels as required and preventing the axle turning except when hand-operated, said gearing being located between the bearings so as to permit the axle to bend elastically, and means for mounting said gearing so that it is free to follow the bending of the axle.

3. Landing gear for amphibian aircraft comprising an axle, telescopic forks carried on the ends of said axle, wheels mounted on said forks, elastic cushioning devices between the telescopic parts of said forks to absorb shocks as the wheels contact with the ground on landing, two intermediate bearings supporting said axle and allowing it to be angularly adjusted, hand-operated gearing for turning said axle so as to raise and lower the wheels as required, said gearing being located between the bearings so as to permit the axle to bend elastically, and means for mounting said gearing so that it is free to follow the bending of the axle.

4. In combination with the buoyant body of amphibian aircraft, an axle mounted in said body and extending from the sides thereof, streamline casings by which the extending parts of said axles are faired, forks carried on the ends of the axle, wheels mounted on said forks, bearings in the sides of said body to allow of angular adjustment of the axle, hand-operated gearing for turning said axle so as to raise and lower the wheels as required, said gearing being located between the bearings so as to permit the axle to bend elastically, and means for mounting said gearing so that it is free to follow the bending of the axle.

5. In combination with the buoyant body of amphibian aircraft, an axle having its central part located in said body and having both ends extending therefrom, bearings at opposite sides of the body in which the axle is mounted so that it can be adjusted angularly about its own axis, forks on both ends of the axle, streamlined casings for the outwardly extending parts of said axle, hand-operated gearing in said body for turning said axle about its axis to raise and lower the wheels as desired, a bearing box carrying said gearing and being vertically movable in said body to allow the axle to bend elastically, a trough extending transversely across said body, and extending around the bottom and sides of said axle, and having a guide for said bearing box, and a cover plate for the top of said trough.

6. In combination with the bouyant body of amphibian aircraft, a trough extending transversely across said body and having a guide intermediate its ends, bearings at the ends of said trough, an axle extending through said trough and being angularly adjustable in the said bearings, and extending therefrom, forks on both ends of the axle, a wheel in each fork, streamlined casings for the outwardly extending parts of said axle, a bearing box slidably mounted in the guide in the trough, low ratio gearing in said box for turning said axle about its axis to raise and lower the wheels relatively to the body and preventing the axle turning except when operated through the gearing, and a hand-operated device for operating said gearing, all being so arranged that the axle can bend elastically, the gearing following the axle to permit the bending but prevent the turning thereof.

In witness whereof we have hereunto set our hands.

ALBERT EUSTACE SHORT.
HUGH OSWALD SHORT.